United States Patent [19]

Marie et al.

[11] Patent Number: 5,373,524

[45] Date of Patent: Dec. 13, 1994

[54] GASEOUS MIXTURE POWER LASER APPARATUS

[75] Inventors: Bruno Marie, Maurepas; Daniel Guerin, Chelles; Christian Larquet, Guyancourt, all of France

[73] Assignee: L'Air Liquide, Societe Anonyme Pour l'Etude et l'Exploitation des Procedes Georges Claude, Paris, France

[21] Appl. No.: 61,421

[22] Filed: May 11, 1993

[30] Foreign Application Priority Data

Jun. 19, 1992 [FR] France .................. 92 07487

[51] Int. Cl.$^5$ .............................................. H01S 3/22
[52] U.S. Cl. .................... 372/60; 372/58; 372/59; 372/64
[58] Field of Search ............ 372/55, 58, 59, 60, 372/61, 64, 90, 108, 6

[56] References Cited

U.S. PATENT DOCUMENTS

| | | | |
|---|---|---|---|
| 3,895,313 | 7/1975 | Seitz | 331/94.5 |
| 4,088,966 | 5/1978 | Samis | 372/90 X |
| 4,439,860 | 3/1984 | Kurnit | 372/64 X |
| 4,681,396 | 7/1987 | Jones | 372/6 X |
| 4,928,286 | 5/1990 | Foreman et al. | 372/90 |
| 5,038,357 | 8/1991 | Lavarini et al. | 372/58 |
| 5,210,768 | 5/1993 | Seguin | 372/66 X |

OTHER PUBLICATIONS

Fahad S. Al-Mashaabi et al., "Direct Current-Excited CW $CO_2$ Metal Waveguide Laser", May 15, 1989, pp. 1897–1903, *Applied Optics*, vol. 28, No. 10, New York.

Clyde O. Brown, "High-Power $CO_2$ Electric Discharge Mixing Laser", Nov. 1, 1970, pp. 388–391, *United Aircraft Research Laboratories*, East Hartford, Conn.

Michel E. Marhic et al., "Whispering-Gallery $CO_2$ Laser", Jun. 6, 1979, pp. 487–490, *IEEE Journal of Quantum Electronics*, vol. QE-15, No. 6.

Peter W. Smith, "Transversely Excited Waveguide Gas Lasers", Jul. 7, 1981, pp. 1166–1181, *IEEE Journal of Quantum Electronics*, vol. QE-17, No. 7.

*Primary Examiner*—Rodney B. Bovernick
*Assistant Examiner*—Hemang Sanghavi
*Attorney, Agent, or Firm*—Young & Thompson

[57] ABSTRACT

Mixing power laser apparatus, comprising a generator of a flow of excited nitrogen (1), and structure (6; 19) to introduce a flow of $CO_2$ into the flow of excited nitrogen. The generator (1) is of the cold corona electric discharge type operating at a pressure greater than $0.3 \times 10^5$ Pa, and is coupled to a waveguide (2) with mirrors (3, 4) opposed along a principal direction of the waveguide. For use particularly in cutting material.

23 Claims, 2 Drawing Sheets

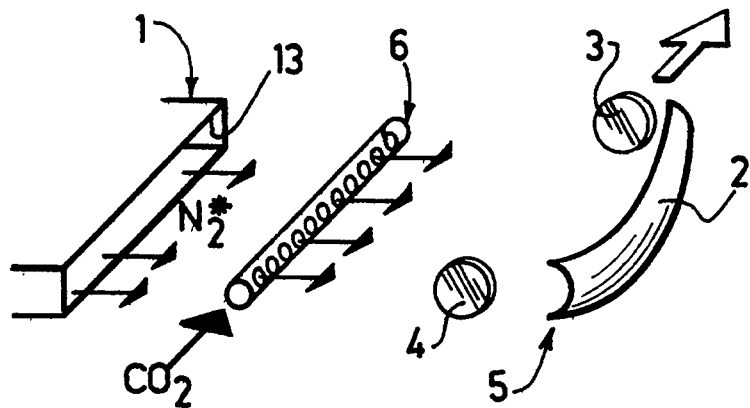
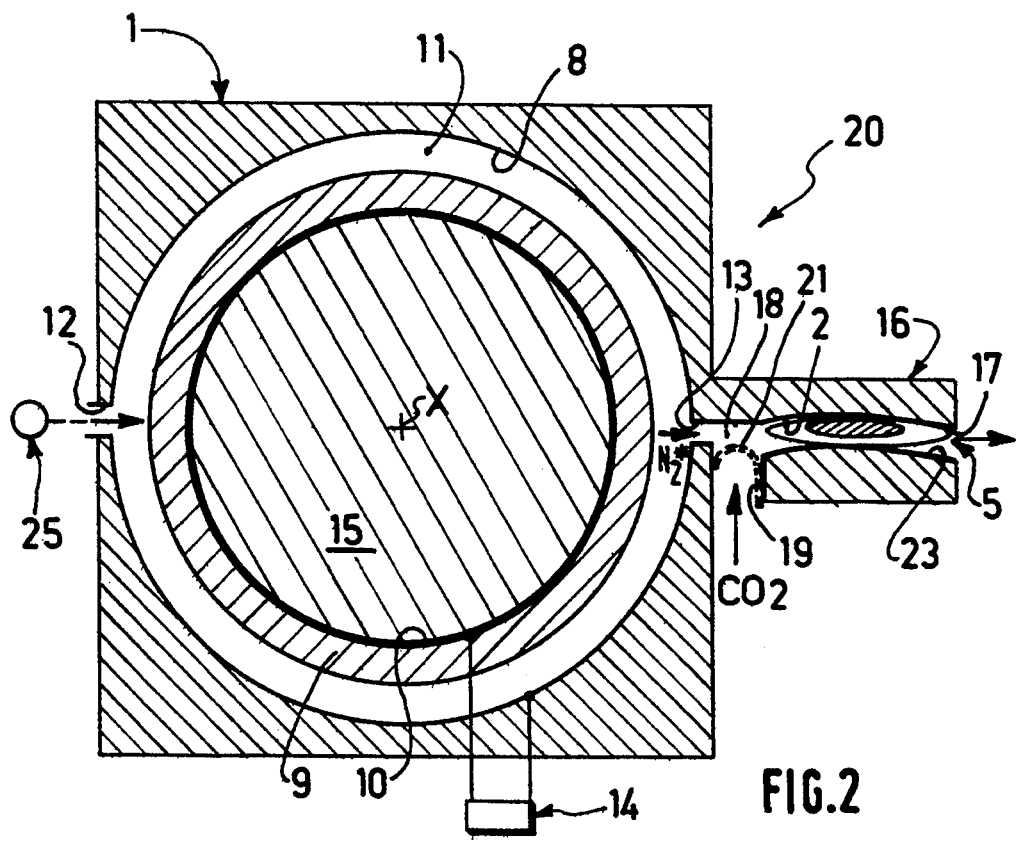

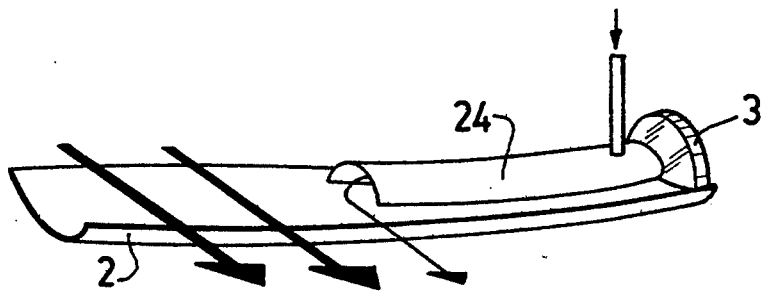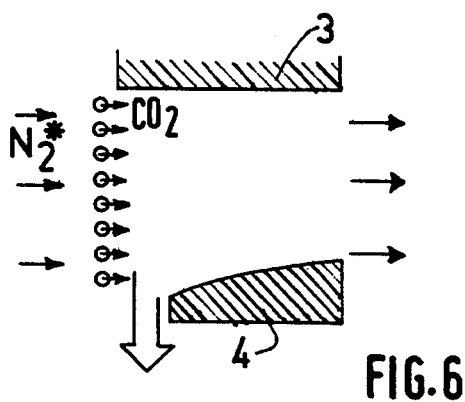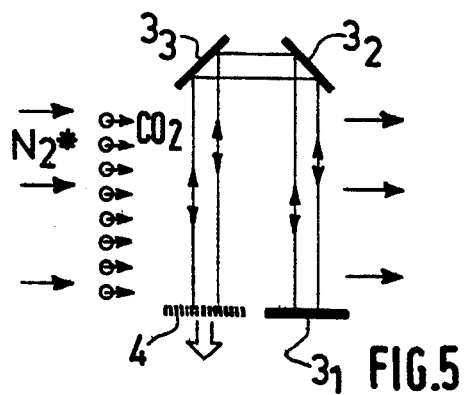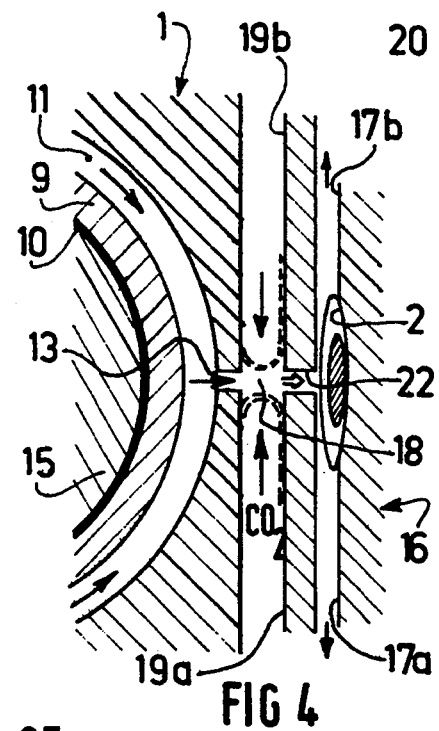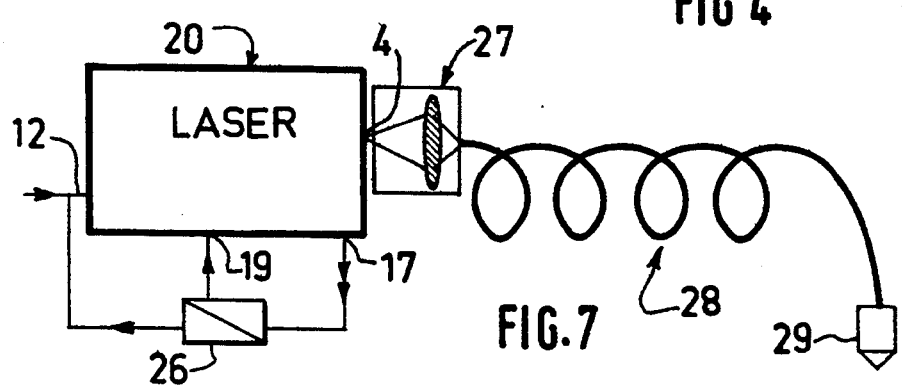

GASEOUS MIXTURE POWER LASER APPARATUS

BACKGROUND OF THE INVENTION

FIELD OF THE INVENTION

The present invention relates to mixing power laser apparatus, of the type comprising an excited nitrogen flow generator with means to introduce a flow of $CO_2$ (carbon dioxide) into the excited nitrogen flow, downstream of the generator.

A mixing $CO_2$ laser apparatus of this type is described in the article "High Power $CO_2$ Electric Discharge Mixing Laser" by C. O. Brown in Applied Physics Letters, Vol. 17, No. 9, November, 1970. Although such EDM lasers were disclosed some time ago, they have not been the subject of industrial development, particularly because of their operation at very low pressure, the poor choice of generators of the excited type and the recommended use of helium. On the other hand, $CO_2$ power lasers, in general, have had rather restricted use on an industrial scale because of their high cost and their insufficient reliability, essentially as to the optical components but also because of problems of loss, and furthermore because there exist no optical fibers adapted to transmit high power at the wavelength of 10 microns of these lasers.

SUMMARY OF THE INVENTION

The present invention has for its object to provide a power mixing laser apparatus for industrial use at low cost, with greatly improved reliability and providing, in a compact form, for the delivery of high power, which can exceed a kilowatt.

To do this, according to a characteristic of the invention, the excited nitrogen flow generator is of the cold electric discharge type operating at a pressure higher than $0.3 \times 10^5$ Pa and is coupled to a waveguide with opposed mirrors along a principal direction.

By "cold electric discharge", is intended the formation of excited species in a gaseous mixture, the temperature of the electrically neutral species of the gaseous mixture not exceeding 250° C., more generally 150° C. This type of discharge is also called, according to the authors, for example "Corona Discharge", "Atmospheric Pressure Glow Discharge", "Barrier Discharge" or also "Silent Discharge".

According to other characteristics of the invention:
the generator comprises a tubular discharge chamber with gas circulation transverse to the axis of the chamber;
the principal direction of the waveguide is substantially parallel to the axis of the chamber;
the $CO_2$ is introduced into a gas passage parallel to said axis;
the waveguide is of the whispering gallery type and has the shape of an arcuate trough of large radius of curvature and having a principal direction substantially parallel to said axis;
at least one of the mirrors comprises at least one diamond wafer.

The structure and properties of a whispering gallery as a waveguide are described in U.S. Pat. No. 4,194,808, Marhic et al. The use of a laser of such a whispering gallery is described in the article "Whispering Gallery $CO_2$ Laser" by Marhic et al. in IEEE Journal of Quantum Electronics, Volume QE-15, No. 6, June, 1979. The whispering gallery $CO_2$ lasers have until now been plagued by problems of short life, particularly because of the degradation provoked by electric discharges in the region of propagation of the beam, and of power, limited by the volume of the amplifying medium.

The arrangement according to the present invention permits avoiding the above problems, the concept of the mixing laser and the excitation of the nitrogen beam in a generator of the cold discharge type of relatively high pressure permitting obtaining a very high and continuous gain. Moreover, with a mixing laser, there is available a considerable gas flow to sweep the mirrors of the waveguide, which prevents particles from depositing there and creating hot points, leading to their rapid deterioration. The use of diamond mirrors permits on the other hand substantially eliminating the problems of short lifetime of these latter. Moreover, the adjustment of the mirrors of a waveguide laser of short length is not critical, which is even more true with a whispering gallery: a variation of 2° of the orientation of the mirrors does not give rise to any change of power and the laser remains mono-mode even with a misalignment of 1°. The mode of a whispering gallery remains small, of the order of 1 mm$^2$, even with a very high radius of curvature of the gallery. For a beam d'1 kW, the intracavity power density is higher than 200 kW/cm$^2$, which is entirely tolerable by a diamond mirror.

According to other characteristics of the invention:
the gas supplying the generator comprises at least 78% nitrogen, and is typically a mixture of nitrogen and oxygen, for example with an oxygen content of about 5%, the gaseous mixture being then preferably supplied by treatment of the air by an adsorption and/or permeation device;
the apparatus comprises means to introduce into the gaseous mixture a gas selected from the group consisting of helium, hydrogen and water vapor.

The present invention has for another object to provide an industrial apparatus of the type defined above for cutting material, characterized in that it is coupled at its outlet to a multi-spiral whispering gallery terminating in a focusing head, thereby to exploit to the maximum the properties of the whispering gallery.

BRIEF DESCRIPTION OF THE DRAWINGS

Other characteristics and advantages of the present invention will appear from the following description of embodiments, given by way of illustration but not limiting, with respect to the accompanying drawings, in which:

FIG. 1 is a schematic view showing the arrangement in principle of an apparatus according to the invention;

FIG. 2 is a schematic cross-sectional view of an apparatus according to the invention;

FIG. 3 is a fragmentary schematic view of an embodiment of the invention;

FIG. 4 is a view similar to FIG. 2 showing another embodiment of the invention;

FIGS. 5 and 6 are schematic views of cavities for the correction of dissymmetry of the beam according to the invention; and FIG. 7 is a schematic view of an industrial apparatus for cutting materials according to the invention.

In the description which follows and in the drawings, the identical or analogous elements bear the same reference numerals.

DETAILED DESCRIPTION OF THE INVENTION

As seen in FIG. 1, an apparatus according to the invention comprises a discharge generator 1 delivering at its output a gas flow comprising excited nitrogen molecules, supplied to a resonant cavity constituted by a waveguide, for example a section of whispering gallery 2 in the shape of an arcuate trough having a principal radius of curvature greater than 1 m and provided at its opposite ends with a reflecting mirror 3 and a mirror or a window 4 for transmission of the laser beam. A flow of $CO_2$ is mixed with the flow containing excited nitrogen by an injection device 6 interposed between the resonant cavity 5 and the output of the generator 1. The generator 1 is arranged to produce, via an elongated outlet passage 13, a homogeneous gas flow transversely to the waveguide 2, which has the shape of a trough having a principal direction substantially parallel to the passage of outlet 13.

In the embodiment shown in FIG. 2, the generator 1 is as disclosed in French patent application No. 92.07486 in the name of the applicant, and comprises essentially, in a metallic block, a tubular peripheral electrode 8 having an axis X, concentrically surrounding a coaxial dielectric tube 9 on the internal surface of which is applied an internal electrode 10 and providing, with the peripheral electrode 8, a tubular gas passage 11 coaxial to the dielectric tube 9 and opening outwardly of the block through an inlet 12 and an outlet 13 in the shape of slots, parallel to the axis X of passage 11, diametrically opposed and having a height not exceeding the radial thickness of the tubular passage 11. The electrodes 8 and 10 are connected to a high voltage high frequency generator 14. The internal electrode 10 delimits an internal volume in which circulates a cooling fluid 15, for example water or a Freon.

According to the invention, in the embodiment of FIG. 1, the apparatus 20 is completed by a block 16 joined to the generator block 1 defining a longitudinal recess having a height of about 1 mm and in which is disposed the whispering gallery 2 with the bottom of the trough substantially parallel to the diametrical plane of the inlet and outlet 12 and 13, with a lateral outlet gas passage 17 and a parallelepipedal inlet gas passage 18 prolonging the outlet 13 of the block 1 and into which opens transversely a parallelepipedal passage 19 permitting the introduction of $CO_2$ into the inlet 18, by for example a mixing grill 21 to mix the $CO_2$ with the gas flow containing the excited nitrogen, this latter transferring its energy to the $CO_2$ before introduction into the laser cavity by exciting exclusively the upper level of the transition laser.

The laser beam, shown schematically in FIG. 2, is elliptical and has a linear polarization. The gas entering from one side, rich in vibrational energy and leaving without this energy, the beam is dissymmetric according to the direction of gas flow transversely of the gallery 2 (axis Z). To cancel this dissymmetry, there can be adopted the arrangement of FIG. 4, permitted by the unilateral optical guidance of the whispering gallery, which is to say with this latter disposed vertically facing the downstream end 22 of the gas passage 18 opposite the outlet passage 13 of the body 1, the $CO_2$ inlets 19A, 19B being then preferably symmetrical, as are also the gas outlet passages 17A, 17B. There can also be used a so-called bent-back cavity with three reflecting mirrors $3_1$ of which two ($3_2$, $3_3$) are inclined (FIG. 5), an unstable cavity with a profiled mirror (4) providing an escape opening (FIG. 6) or a waveguide having at least one porous guide surface permitting the injection of a gas flow passing through that surface. On the other hand, in the embodiment of FIG. 2, to guarantee that a substantial portion of the excited species passes through the zone containing the photons, the lower wall 23 of the recess of the gallery 2 can be provided with oriented indentations thus favoring the formation of a highly turbulent flow in the recess.

According to one aspect of the invention, the mirrors 3 and 4 at the ends of the whispering gallery 2 are constituted by at least one wafer of C-II-A diamond coated or not, as described for example in the French patent application No. 92.02437 in the name of the applicant. As will be seen in FIG. 3, which shows a waveguide constituted by a whispering gallery 2, if it is not desired to use the gaseous mixture flow passing through the waveguide 2 to effect sweeping of the mirrors 3 and/or 4, these latter can be swept by an auxiliary filtered flow gas sent through a hood 24 disposed adjacent the mirror 3 and of dimensions slightly greater than those of the laser mode.

The gas introduced into the generator 1, from a source of gas 25, has a pressure between $0.3 \times 10^5$ Pa and $3 \times 10^5$ Pa, preferably about $0.5 \times 10^5$ Pa or, for simplicity of operation, at atmospheric pressure, is a gaseous mixture containing at least 78% nitrogen, typically oxygen, for example air. Helium, generally used in high proportion in mixing lasers, is not necessary here. Helium thus has for its purpose to stabilize the discharge and to disexcite the lower level of the laser transition. The stabilizing effect is here unneeded thanks to the use of the cold discharge in the generator 1. The disexcitation can be carried out by addition, preferably at the region of introduction of $CO_2$, of hydrogen or water vapor, introduced in a flow of vector gas, for example, which are for this purpose much more effective than helium. Hydrogen and water vapor disexciting also the upper level of laser transition, it is necessary that their concentration be precisely controlled. The quantity of hydrogen thus should not exceed 2 or 3% of the total gas flow, the hydrogen being preferably introduced with the $CO_2$ downstream of the generator to avoid disexcitation of the nitrogen. The quantity of water vapor mixed with the $CO_2$ should not exceed 10,000 ppm.

The generator 1 can be supplied with nitrogen containing a small quantity of oxygen, greater than 1%, preferably obtained by adsorption or permeation from air, which permits greatly diminishing the cost of the nitrogen. Thus, the output of the corona discharge generator 1 is only slightly diminished, relative to substantially pure nitrogen, with nitrogen containing 5% of oxygen. The oxygen contained in the nitrogen will be partially transformed in the generator 1 into ozone, which can be efficiently destroyed by the hydrogen mixed in the $CO_2$, to produce water. In the case in which the generator is supplied with air, the pressure in the generator 1 is preferably about $0.5 \times 10^5$ Pa and the supplied air is purified from water such that the water content does not exceed 5,000 ppm and will preferably be less than 100 ppm. Between 100 and 5,000 ppm, the water content should be maintained constant. For a given air flow rate, at a pressure of $0.5 \times 10^5$ Pa, the flow rates of $CO_2$ and hydrogen introduced downstream are respectively, in a preferred embodiment, between 10 and 30% and between 0.5 and 1% of the air flow rate.

To limit the consumption of the different gases, there is preferably provided, as shown in FIG. 7, a gas recycle circuit causing the gaseous mixture discharged at the outlet 17 to pass into a membrane permeation device 20 permitting recovery of the $CO_2$, the helium or the hydrogen, reintroduced at 19, and if desired to reinject at the input 12 purified nitrogen. In this same FIG. 7, there is shown a complete apparatus for the cutting of material. The laser beam leaving the mirror 4 of the laser 20 is directed, via a coupling system 27, to a flexible multi-turn whispering gallery 28 comprising, at its free end, a focusing system 29 displaceable independently of the laser 20 to follow the cutting profile.

Although the invention has been described with respect to particular embodiments, it is not thereby limited but on the contrary is susceptible to modifications and variations which will be apparent to those skilled in the art.

What is claimed is:

1. A gas laser apparatus, comprising a cold corona electric discharge generator forming an excitation chamber having a gas inlet and a gas outlet, the gas outlet in fluid flow communication with a waveguide having a principal direction and mirrors opposed along said principal direction, means for circulating a first flow of a primary gas mixture including mainly nitrogen at a pressure above $0.3 \times 10^5$ Pa from said gas inlet to said waveguide, and introduction means for introducing a flow of carbon dioxide into said first flow between said gas outlet and said waveguide to form gaseous mixture supplying said waveguide.

2. Apparatus according to claim 1, wherein the generator (1) comprises a tubular discharge chamber (11) having an axis (X), said nitrogen flowing transversely to said axis (X).

3. Apparatus according to claim 2, said principal direction of the waveguide (2) being parallel to said axis (X).

4. Apparatus according to claim 3, the $CO_2$ being introduced through at least one gas passage (18) parallel to said axis (X).

5. Apparatus according to claim 2, the waveguide (2) having the shape of an arcuate trough having said principal direction substantially parallel to said axis (X).

6. Apparatus according to claim 5, wherein a bottom of said trough (2) is substantially parallel to the flow of gaseous mixture.

7. Apparatus according to claim 5, wherein the bottom of said trough (2) is substantially perpendicular to the flow of gaseous mixture.

8. Apparatus according to claim 1, wherein at least one of the mirrors (3; 4) comprises at least one diamond wafer.

9. Apparatus according to claim 1, wherein the primary gas mixture (25) supplying the generator (1) comprises at least 78% nitrogen.

10. Apparatus according to claim 9, wherein a content of water vapor in the primary gas mixture (25) supplying the generator (1) is less than 5,000 ppm.

11. Apparatus according to claim 9, wherein the primary gas mixture (25) supplying the generator (1) comprises about 5% oxygen.

12. Apparatus according to claim 1, further comprising means to introduce into the gaseous mixture supplied said waveguide (2) a gas selected from the group consisting of helium, hydrogen and water vapor.

13. Apparatus according to claim 12, wherein the hydrogen content of the gaseous mixture supplying said waveguide (2) is less than 3% by volume.

14. Apparatus according to claim 12, wherein the water vapor content of the gaseous mixture supplying said waveguide (2) is less than 10,000 ppm.

15. Apparatus according to claim 1, wherein the pressure of the primary gas mixture (25) supplying the generator (1) is about $0.5 \times 10^5$ Pa.

16. Apparatus according to claim 1, wherein the pressure of the primary gas mixture (25) supplying the generator (1) is about $1 \times 10^5$ Pa.

17. Apparatus according to claim 1, for cutting material, further comprising a multi-turn whispering gallery (28) terminating in a focusing head (29), said multi-turn whispering gallery (28) being coupled to said gas laser apparatus via a coupling system (27).

18. The apparatus of claim 1, further comprising means for withdrawing gases from the waveguide coupled to a separation device adapted to separate nitrogen and $CO_2$ from said gases, and circuit means for recycling the separated nitrogen toward the gas inlet and the separated $CO_2$ towards said introduction means.

19. The apparatus of claim 18, wherein the separation device includes at least a permeation membrane.

20. A mixing gas laser apparatus, comprising a cold corona electric discharge generator forming a tubular excitation chamber having an axis and a gas outlet parallel to the axis, a gas inlet diametrally opposed to the gas outlet, a resonant transverse cavity having a principal direction parallel to said axis, a passage establishing fluid flow communication between the gas outlet and supply the cavity, means for supplying to the gas inlet a primary gas mixture including at least 78% nitrogen at a pressure not less than $0.3 \times 10^5$ Pa, and introduction means for introducing gas components including at least $CO_2$ into said passage.

21. The apparatus of claim 20, wherein said primary gas mixture includes nitrogen and between 1 and 5% oxygen.

22. The apparatus of claim 21, further comprising an air separation device of the adsorption or permeation type connected to said gas inlet for supplying said primary gas mixture.

23. The apparatus of claim 20, wherein said primary gas mixture is air.

* * * * *